United States Patent [19]

Latimer et al.

[11] Patent Number: 4,667,930
[45] Date of Patent: May 26, 1987

[54] METERING SLOT CONFIGURATION FOR A VALVE SPOOL

[75] Inventors: Eugene E. Latimer, Wilmington; Orcenith D. McWilliams, Morris, both of Ill.

[73] Assignee: Caterpillar Inc., Peoria, Ill.

[21] Appl. No.: 871,957

[22] Filed: Jun. 9, 1986

[51] Int. Cl.⁴ .......................................... F15B 13/04
[52] U.S. Cl. ............................. 251/324; 137/596.13; 137/625.3; 137/625.69
[58] Field of Search .......... 137/596.13, 625.3, 625.69; 251/282, 324

[56] References Cited

U.S. PATENT DOCUMENTS

| | | |
|---|---|---|
| 2,971,536 | 2/1961 | Junck et al. |
| 3,009,480 | 11/1961 | Miller ............................ 137/625.69 |
| 3,255,778 | 6/1966 | Rosebrook ..................... 137/625.69 |
| 3,995,532 | 12/1976 | Junck et al. |
| 4,009,864 | 3/1977 | Schexnayder ...................... 251/282 |
| 4,245,816 | 1/1981 | Johnson ....................... 137/625.3 X |

FOREIGN PATENT DOCUMENTS

| | | | |
|---|---|---|---|
| 156563 | 12/1981 | Japan ............................. 137/625.69 |
| 29861 | 2/1982 | Japan ............................. 137/625.69 |
| WO84/03342 | 8/1984 | PCT Int'l Appl. |

Primary Examiner—Gerald A. Michalsky
Attorney, Agent, or Firm—John W. Grant

[57] ABSTRACT

Metering slots in valve spools are useful for modulatably controlling fluid flow through a control valve. The current metering slot configurations used in a meter out condition have high flow forces acting on the spool or metering areas that open or increase in size rather slowly relative to the valve spool movement. The subject metering slot is formed by plunging a ball-end end mill cutter into a control face of a valve spool at an acute angle and then moving the cutter laterally to provide the desired width of the metering slot. The resulting metering slot provides a metering area that increases in size rather quickly with a rather small increment of movement of the spool with the flow forces generated by the fluid passing through the metering slot being relatively low.

5 Claims, 7 Drawing Figures

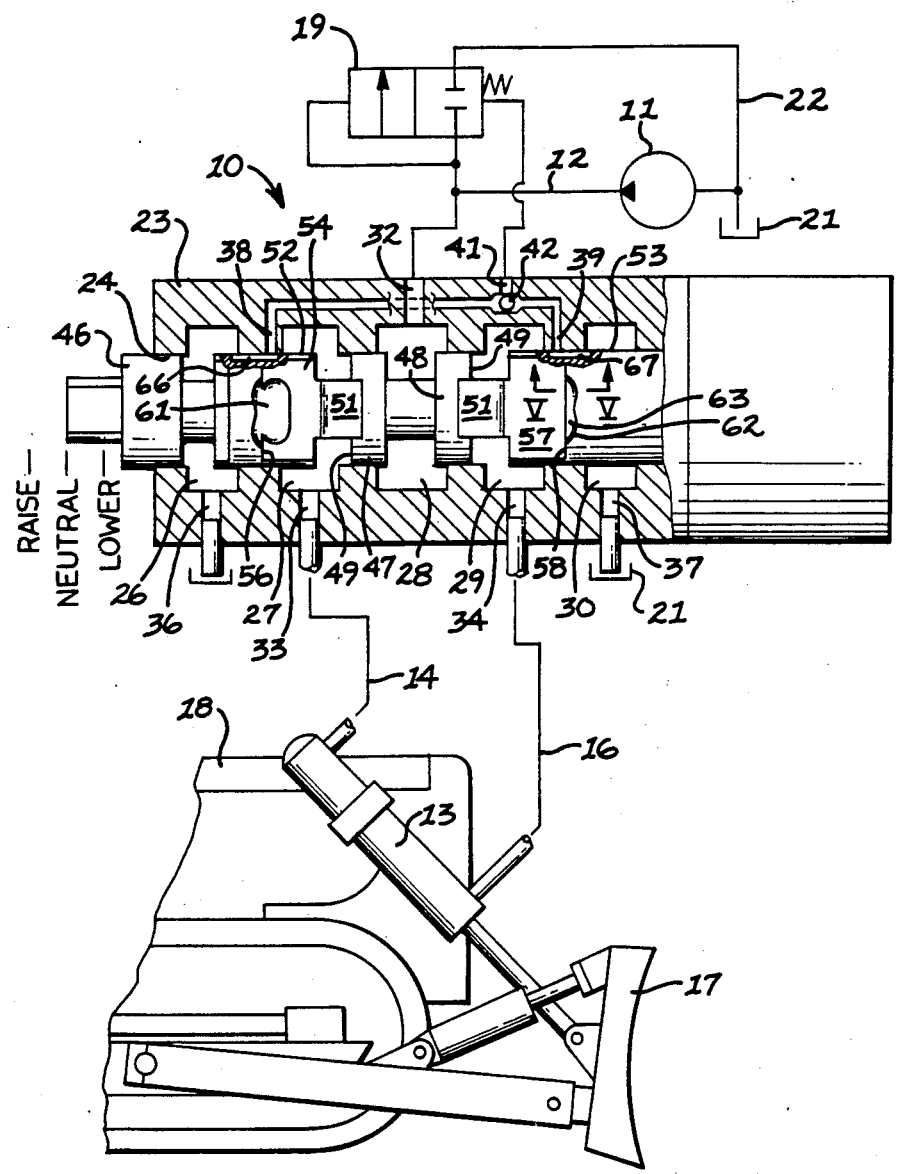

METERING SLOT CONFIGURATION FOR A VALVE SPOOL

DESCRIPTION

1. Technical Field

This invention relates to fluid control valves and more particularly to a metering slot configuration in which flow forces generated by fluid flowing thereacross are relatively low while providing a metering area which increases in size rather quickly with small increments of movement of the valve spool.

2. Background Art

Fluid control or metering slots are commonly formed in a valve spool to interconnect a groove and an adjacent control land in the spool to provide good modulation of fluid flow through the control valve. One of the problems associated with any metering slot configuration is its effect on flow forces generated by the fluid passing therethrough. It is known that generally flow forces generated by a metering slot react differently dependent upon whether the slot is controlling fluid flow in a "meter in" or "meter out" condition. For example, metering slots in the form of shallow, cylindrical pockets formed by plunge cutting with an end mill cutter or the like directed radially inwardly and at a slight angle with respect to the spool provides low flow forces in a meter out condition. The problem with such cylindrical pocket is that the metering area of the slot increases rather slowly with respect to spool travel and in some cases does not provide the desired modulating characteristic. On the other hand, while the key cutter type metering slots can effectively provide the desired modulation by opening a substantial metering area very quickly, the flow forces generated thereby in a meter out condition are rather high. These high flow forces then require centering springs having higher preloads and result in higher lever efforts by the operator causing undue fatigue.

The present invention is directed to overcoming one or more of the problems as set forth above.

DISCLOSURE OF THE INVENTION

In one aspect of the present invention, a fluid control valve includes a body having a bore therein and an annulus communicating with the bore. A valve spool is slidably disposed in the bore and has a cylindrical land and an intersecting control face for controlling fluid flow between the bore and the annulus. The spool has a metering slot in the control face and land formed by causing relative movement between the spool and a rotating end mill cutter to plunge cut into the control face to a preselected depth cutting away a portion of the cylindrical land adjacent the control face and by then causing relative transversing movement between the spool and the cutter so that the cutter cuts laterally across the control face and cylindrical land to establish a preselected width of the metering slot. The cutter is maintained at an acute angle relative to the control face to undercut the cylindrical land defining a flow control edge of the metering slot.

The present invention provides an improved metering slot configuration for a control valve spool in which the flow forces generated by the fluid passing through the slot in a fluid flow metering position of the spool are relatively low. The lateral width of the subject throttling slot permits a metering area of the slot to increase in size very quickly relative to the travel distance of the spool to minimize the restriction to fluid flow thereacross in the fluid flow metering position of the spool travel.

BRIEF DESCRIPTION OF THE DRAWINGS

FIG. 1 is a sectional view through a control valve illustrating an embodiment of the present invention in combination with a diagrammatic illustration of a fluid circuit;

BEST MODE FOR CARRYING OUT THE INVENTION

Figure 2:
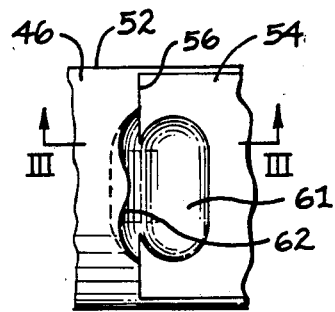
FIG. 2 is a somewhat enlarged plan view of a portion of FIG. 1.

Referring to the drawings, a control valve 10 is connected to a pump 11 via a supply conduit 12 and to the head end and rod end of a hydraulic cylinder 13 via a pair of motor conduits 14 and 16. The rod of the hydraulic cylinder 13 is connected to a blade 17 pivotally mounted on a tractor 18 in the conventional manner. The supply conduit 12 is also connected to a pressure compensated bypass valve 19 which is connected to a tank 21 via a drain conduit 22.

The control valve 10 includes a valve body 23 having a longitudinally extending bore 24 therein and a plurality of axially spaced annuluses 26–30 intersecting the bore. An inlet port 32 connects the supply conduit 12 to the center annulus 28. A pair of motor ports 33,34 connect the motor conduits 14,16 with the annuluses 27,29. A pair of exhaust ports 36,37 connect the annuluses 26 and 30 with the tank 21. A pair of signal ports 38,39 intersect with the bore 24 adjacent the annuluses 27,28 and are connected to a single signal outlet port 41 through a resolver 42.

The control valve 10 also includes a valve spool 46 slidably disposed in the bore 24 and is movable between Raise, Neutral and Lower positions. The spool 46 has a pair of spaced apart cylindrical lands 47,48 which cooperate with the bore 24 when the valve spool 46 is in the Neutral position shown to block the annulus 28 from the adjacent annuluses 27 and 29. Each of the lands 47,48 has an annular control face 49 and a pair of metering slots, one shown at 51, recessed into the control face. The metering slots 51 are of the conventional key cutter type commonly used in a meter in condition. The valve spool 46 also has a pair of cylindrical lands 52,53 at opposite ends of the spool and which cooperate with the bore 24 to block the annuluses 27,29 from the annuluses 26,30 respectively at the Neutral position. A pair of diametrically opposed flat surfaces or chordal recesses, one shown at 54, are provided adjacent the land 52 and intersect with a pair of control faces, one shown at 56. Similarly, a pair of diametrically opposed flat surfaces, one shown at 57, are provided adjacent the land 53 and intersect with a pair of control faces, one shown at 58.

Figure 3:
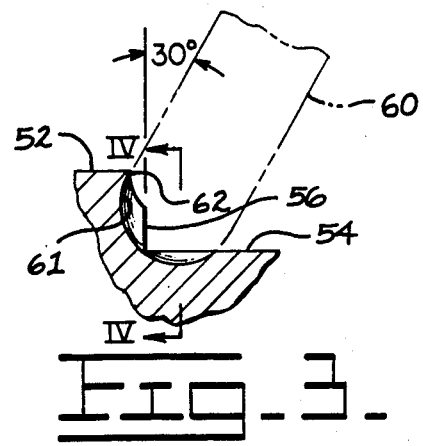
FIG. 3 is a cross-sectional view taken along lines III—III of FIG. 2.
Figure 4:
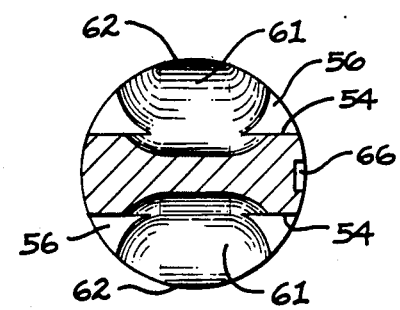
FIG. 4 is a sectional view taken along lines IV—IV of FIG. 3.

As best shown in FIGS. 2-4, a fluid control or metering slot 61 is recessed into each of the control faces 56 of the valve spool 46. The metering slot 61 is formed by positioning a rotating ball-end end mill cutter 60 at a preselected acute angle relative to the control face 56 and at a preselected distance offcenter from the longitudinal axis of the spool. The rotating cutter is then advanced along its longitudinal axis to plunge cut into the control face 56 and flat surface 54 to a preselected depth to form a hemispherical shaped recess therein. The cutter also cuts away a portion of the peripheral surface of the cylindrical land 52. The cutter is then moved transversely relative to the spool so that the cutter cuts a laterally extending semicylindrical-shaped groove across the control face, flat surface, and cylndrical land to establish a preselected width of the metering slot. The cutter is maintained at the preselected angle as it traverses the control face to undercut the peripheral surface of the land and define a flow control edge 62 of the metering slot. The major portion of the metering slot has a substantially semicylindrical surface with the lateral ends of the metering slot being spherically shaped. Moreover, the flow control edge 62 has a wavy or undulating shape as viewed in FIGS. 1 and 2.

Figure 5:
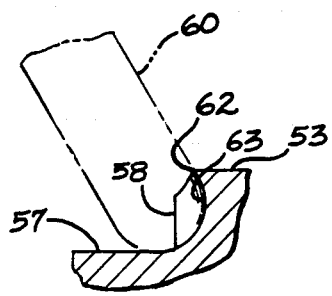
FIG. 5 is a somewhat enlarged sectional view taken along lines V—V of FIG. 1.

As best shown in FIGS. 1 and 5, fluid control or metering slot 63 is also recessed into each of the control faces 58 and cylindrical land 53 of the valve spool 46. The metering slot 63 is formed in a manner as described above with the primary difference being that the diameter of the end mill cutter is slightly smaller so that the bottom surface of the metering slot is contiguous with the flat surface 57.

The preselected angle of the cutter is chosen so that the exit angle of the flow control edge 62 of the metering slots 61,63 is approximately 30° relative to the associated control faces 56,58. In this embodiment the preselected angle of the cutter is about 30°.

The above-described process of forming the metering slots sets forth that the cutter 60 is moved relative to the spool 46. However, it is recognized that identical metering slots can be formed by moving the spool relative to the rotating ball-end end mill cutter. The valve spool 46 also has a pair of axial elongate signal transmitting slots 66,67 in the peripheral surface of the cylindrical lands 52,53 respectively.

Figure 6:
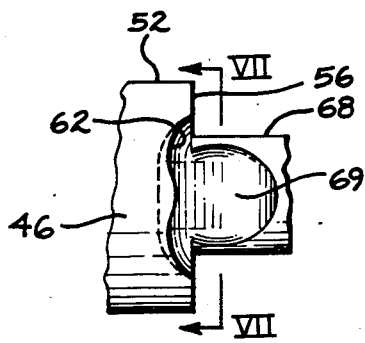
FIG. 6 is a plan view of another embodiment of the present invention.
Figure 7:
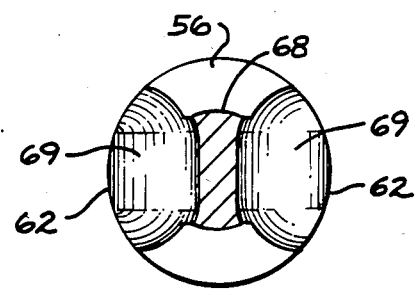
FIG. 7 is a sectional view taken along line VII—VII of FIG. 6.

An alternate embodiment of a metering slot configuration of the present invention is disclosed in FIGS. 6 and 7. It is noted that the same reference numerals of the first embodiment are used to designate similarly constructed counterpart elements of this embodiment. In the embodiment, however, the flat surfaces adjacent the land 53 have been replaced with a reduced diameter cylindrical portion 68 so that the control face 56 is an annular shoulder. A metering slot 69 is formed in the annular control face 58 and cylindrical portion 68 by the same process described above.

INDUSTRIAL APPLICABILITY

In operation, the blade 17 is raised by shifting the valve spool 46 leftward from the position shown toward the Raise position. In so doing, the signal slot 67 establishes communication between the annulus 29 and the signal port 39, the annulus 28 is in communication with the annulus 29, and the annulus 27 is in communication with the annulus 26. Establishing communication between the annulus 29, and the signal port 39 causes a load signal to be directed to the bypass valve 19 to shift it to the left to resist or block fluid flow from the supply conduit 12 to the tank. With the annulus 28 in communication with the annulus 29, fluid from the supply conduit 12 is directed through the motor conduit 16 to the rod end of the hydraulic cylinder 13 causing the hydraulic cylinder to retract. The fluid exhausted from the head end of the hydraulic cylinder 13 passes through the metering slot 61 in a meter out direction and is returned to the tank 21.

Due to the area difference between the head end and rod end of the hydraulic cylinder, the volume of fluid exhausted from the head end of the cylinder is approximately 150% of the volume being directed into the rod end. The metering slot 61 provides a metering area which increases in size very quickly as the valve spool 46 is moved to the operating position to minimize the pressure drop across the valve spool. Moreover, the profile of the metering slot 61 minimizes the flow forces generated by the fluid passing therethrough and past the flow control edge 62. In a direct comparison with a key cutter slot (similar to the metering slot 51) under identical operating conditions, the flow forces generated by the present metering slot configuration were reduced to less than half the flow forces generated by the key cutter metering slot. The reduction in flow forces is attributed primarily to the exit angle of the flow control edge 62 of the metering slot which causes the fluid to exit from the slot at an angle opposite to the direction of the fluid entering the slot and at an acute angle relative to the control face.

When the blade 17 is dropped from a high height by shifting the valve spool 46 rightward to the Lower position, a large volume of fluid is forced from the rod end of the hydraulic cylinder 13 and must pass through the metering slot 63. However, the metering slot 63 also provides a rather large area which opens very quickly as the spool is moved rightward to the Lower position and thereby minimizes the pressure drop across the spool. The profile of the metering slot 63 also minimizes the flow forces generated by the large flow passing therethrough in the manner described above. The wavy shape of the flow control edge 62 provides fine control over fluid flow through the metering slot at the initial opening of the metering slot when fine modulated control of the speed of the hydraulic cylinder is desired.

In view of the above, it is readily apparent that the structure of the present invention provides an improved metering slot configuration capable of precise modulation of high fluid flows while minimizing the generation of flow forces. The profile of the control edge of the metering slot provides for the opening of a rather large metering area with a relatively short travel distance of the spool to minimize the restriction of flow therethrough. The profile of the metering slot also causes the fluid to exit from the metering slot at an angle which minimizes the flow forces acting on the spool.

Other aspects, objects and advantages of this invention can be obtained from a study of the drawings, the disclosure and the appended claims.

We claim

1. In a fluid control valve including a body having a bore therein and an annulus intersecting with the bore, and a valve spool slidably disposed in the bore and having a cylindrical land and an intersecting control face for controlling fluid flow between the bore and the annulus, the improvement comprising said valve spool having a metering slot in said control face and said land formed by causing relative movement between the valve spool and a rotating end mill cutter to plunge cut into the control face to a preselected depth cutting away a portion of the cylindrical land adjacent the control face and by then causing relative transverse movement between the valve spool and the cutter so that the cutter cuts laterally across the control face and land to establish a preselected width of the metering slot, said cutter being maintained at an acute angle relative to the control face to undercut the cylindrical land defining a flow control edge of the metering slot.

2. The control valve of claim 1 wherein the end mill cutter is a ball-end end mill cutter.

3. The control valve of claim 2 wherein said valve spool has a flat surface intersecting with the control face wherein a portion of said metering slot is cut into the flat surface by the cutter simultaneous with the cutting of the slot in the control face and the cylindrical land.

4. The control valve of claim 2 wherein said valve spool has a reduced diameter cylindrical portion intersecting with the control face wherein a portion of said metering slot is cut into the reduced diameter cylindrical portion by the cutter simultaneous with the cutting of the slot in the control face and cylindrical land.

5. The control valve of claim 1 wherein the flow control edge has a wavy shape.

* * * * *